(No Model.)
W. H. WILKINSON.
BREAST DRILL.
No. 491,624. Patented Feb. 14, 1893.
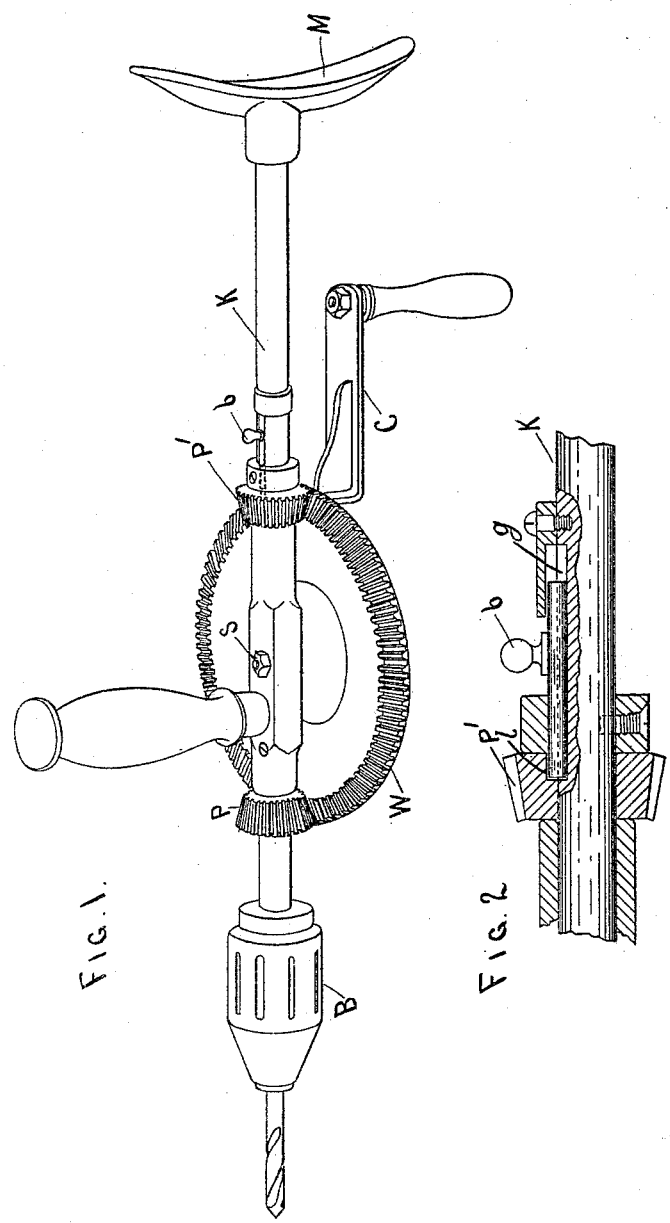
WITNESSES:
Eleanor F. Groll
Grace M. Shay
INVENTOR:
William H. Wilkinson,
by his attorneys,
Lange & Roberts.

UNITED STATES PATENT OFFICE.

WILLIAM H. WILKINSON, OF BOSTON, MASSACHUSETTS.

BREAST-DRILL.

SPECIFICATION forming part of Letters Patent No. 491,624, dated February 14, 1893.

Application filed June 16, 1892. Serial No. 436,985. (No model.)

*To all whom it may concern:*

Be it known that I, WILLIAM H. WILKINSON, of Boston, in the county of Suffolk and State of Massachusetts, have invented an Improvement in Breast-Drills, of which the following description, in connection with the accompanying drawings, is a specification, like letters on the drawings representing like parts.

The object of my invention is to provide means whereby a breast drill, or any similar tool having rotating parts driven by geared wheels, may be locked so that its working parts may be firmly set while the operator manipulates the chuck-sleeve in order to insert or remove a drill or other tool.

In the absence of some contrivance for locking the gears of a breast-drill much difficulty has heretofore been experienced, because when the chuck-sleeve is being screwed up hard enough to hold a drill, especially a round drill, so much power is transmitted through the train of driving gears, that a workman can hardly hold the gears firmly enough to enable him to get a good grip on the drill with the chuck. So, if a breast-drill of the form shown in the accompanying drawings be used without any locking device, a workman who screws up the chuck with one hand cannot hold the gears still with the other hand. My invention overcomes this difficulty, and is described as follows:

Figure 1 is a perspective view of a breast drill with my attachment applied; and Fig. 2 a sectional detail.

In the drawings, Fig. 1, represents a common form of breast-drill, having a master-wheel W, driven by the hand-crank C. The wheel W, is journaled on a stud S upon the stock K. Bevel pinions, P and P' rotating on the stock K, mesh with the master-wheel W. The pinion P carries with it the chuck B; the pinion P' is loose on the stock K, and serves to steady the master wheel W.

To the mechanism of the breast-drill shown in Fig. 1, I add my locking contrivance. This may be applied to any one of the working parts of the drill, because if one member of a train of gears is locked, all the members are locked. Thus my contrivance may take various forms, adapted to arrest the master-wheel W, or the pinion P, or P', or any portion of the intermeshing mechanism.

The form of lock which in its application to the drill and in its operation seems preferable, is that shown in Fig. 1, and in detail in Fig. 2; but I do not wish to be understood as limiting my invention to the precise form of device described.

In the stock K (Fig. 2), a groove $g$ is cut parallel to the axis of the stock. A slot $l$, corresponding in dimensions to the groove $g$, is cut in the idler-pinion P'. In the groove $g$, slides the bolt $b$, which, when the rotation of P' brings the groove $g$, and the slot $l$ into line with each other, may be shot forward into the slot $l$, locking the pinion P', and consequently the entire train of gears. When the pinion P' is thus locked, the workman may screw up the chuck-sleeve as hard as he pleases, without fear of the gear train rotating.

In Fig. 1, the bolt $b$ and its surroundings are shown between the pinion P' and the breast-piece M, where it will be convenient to the workman's hand.

I claim—

1. In a breast drill, the combination of a lock mounted on the stationary portion of the drill and adapted to engage the gear-train of the drill, whereby the gear train is made immovable while the drill chuck is being manipulated.

2. In a breast drill, in combination with the drill-actuating mechanism a bolt, sliding on the drill stock, adapted to engage a bolt-aperture in the gear train, and a member of the gear train containing the said bolt aperture, whereby the gear train is made immovable while the drill chuck is being manipulated.

In testimony whereof I have signed my name to this specification in the presence of two subscribing witnesses.

WILLIAM H. WILKINSON.

Witnesses:
    FREDERICK L. EMERY,
    ODIN B. ROBERTS.